United States Patent

[11] 3,530,943

[72] Inventor Charles R. Taylor
  Tremonton, Utah
[21] Appl. No. 645,279
[22] Filed June 12, 1967
[45] Patented Sept. 29, 1970
[73] Assignee fifty percent to La Moyne Roberts
  Tremonton, Utah

[54] AUTOMATIC DRAW BAR ADJUSTMENT CONNECTION MEANS
  15 Claims, 14 Drawing Figs.
[52] U.S. Cl. .................................................. 172/2,
  172/4.5, 172/667
[51] Int. Cl. ..................................................... A01b/41/06,
  A01b 65/00

[50] Field of Search............................................. 172/2.45, 7,
  6, 9, 10, 324, 325; 280/467, 468; 172/667

[56] References Cited
UNITED STATES PATENTS
| | | | |
|---|---|---|---|
| 2,853,315 | 9/1958 | Hyman.......................... | 280/468 |
| 2,902,979 | 9/1959 | Gurries et al. ................. | 172/4.5 |
| 2,941,319 | 6/1960 | Beemer et al.................. | 172/4.5 |

Primary Examiner—Robert E. Pulfrey
Assistant Examiner—Stephen C. Pellegrino
Attorney—Olson, Trexler, Wolters and Bushnell ABSTRACT: This invention relates generally to an attachment means for adjustably connecting an earth working device to a vehicle, and more particularly to a control mechanism for automatically altering the position of a plow relative to a tractor as a function of the slope of the hillside.

Patented Sept. 29, 1970

Inventor
Charles R. Taylor
By: Olson, Trexler, Wolters & Bushnell
attys

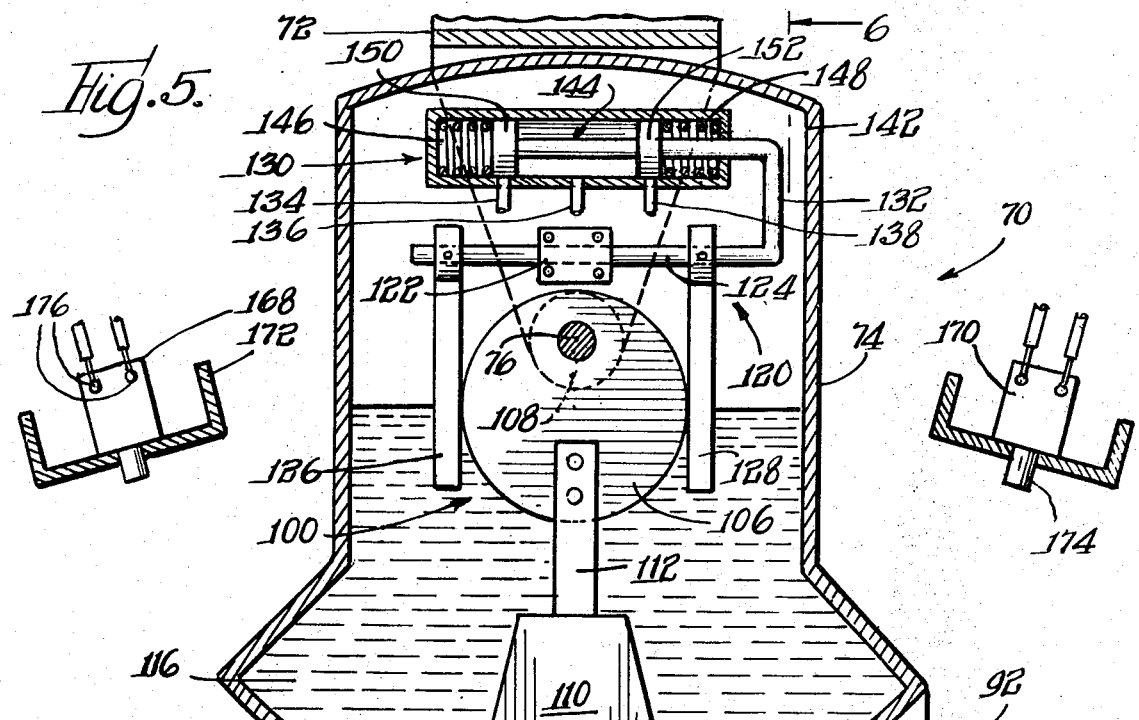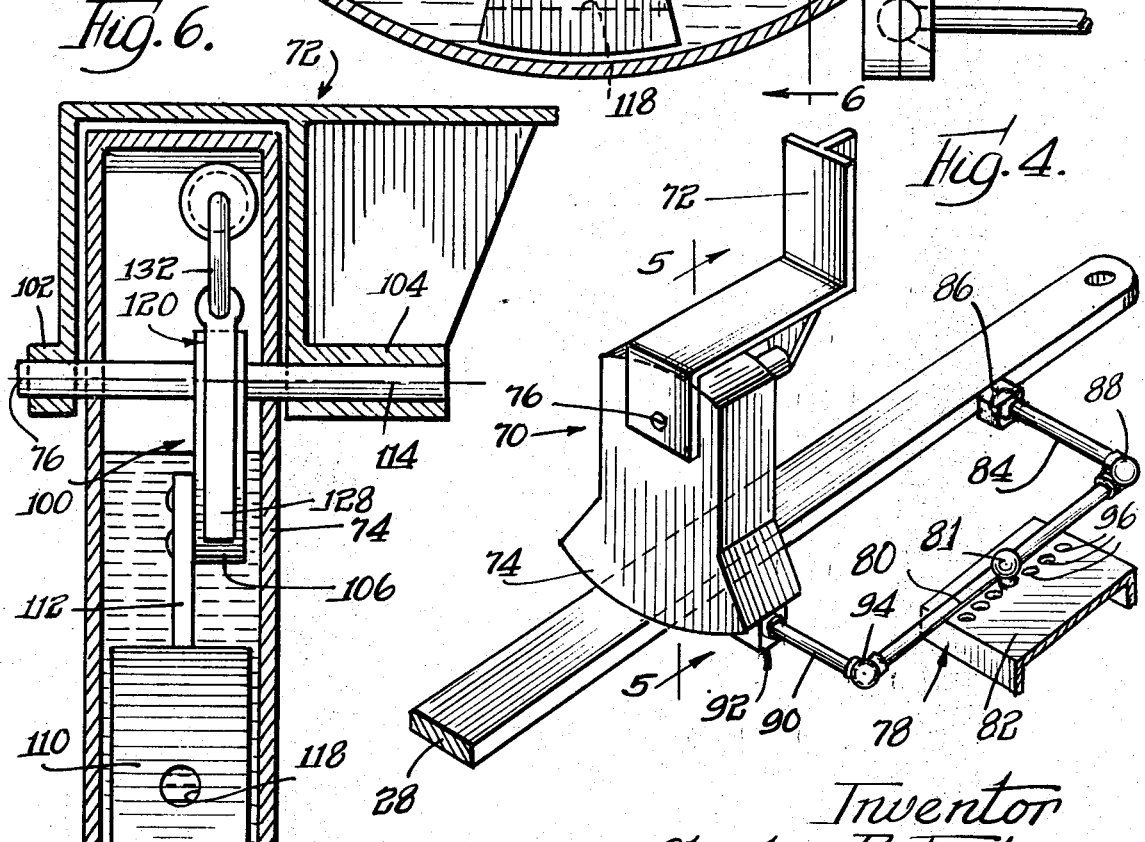

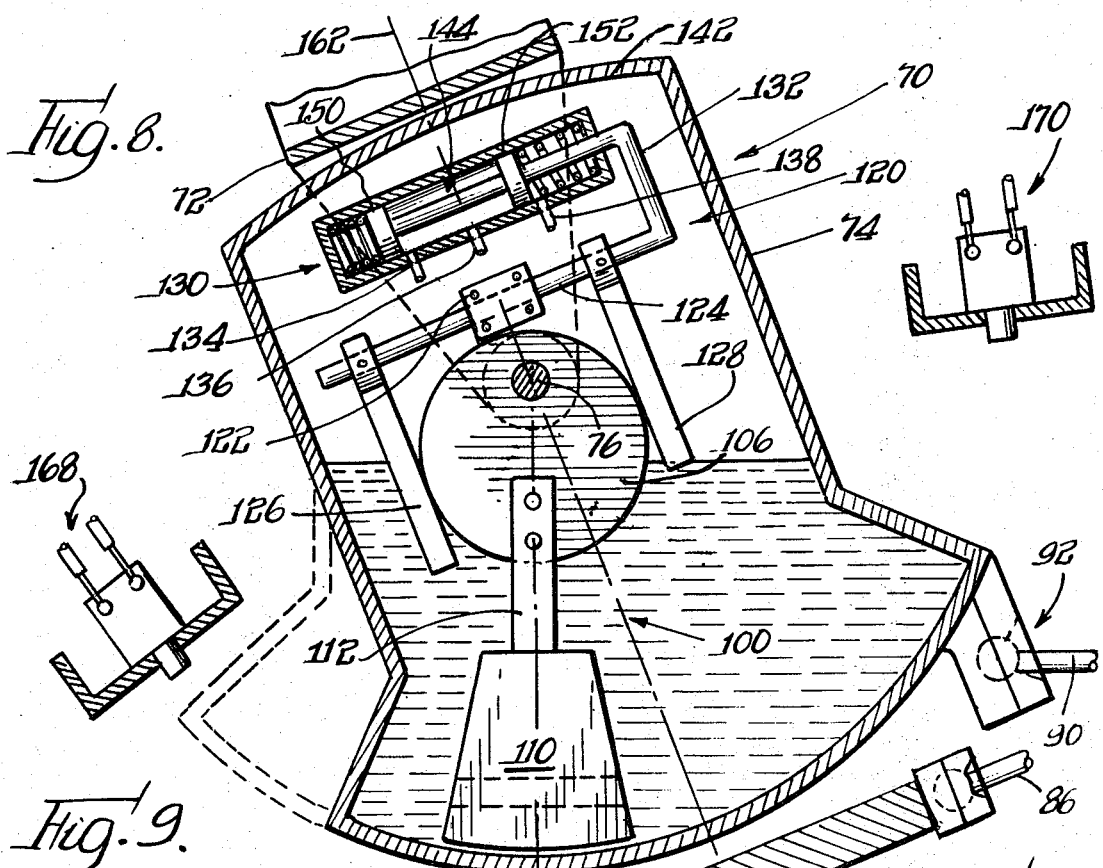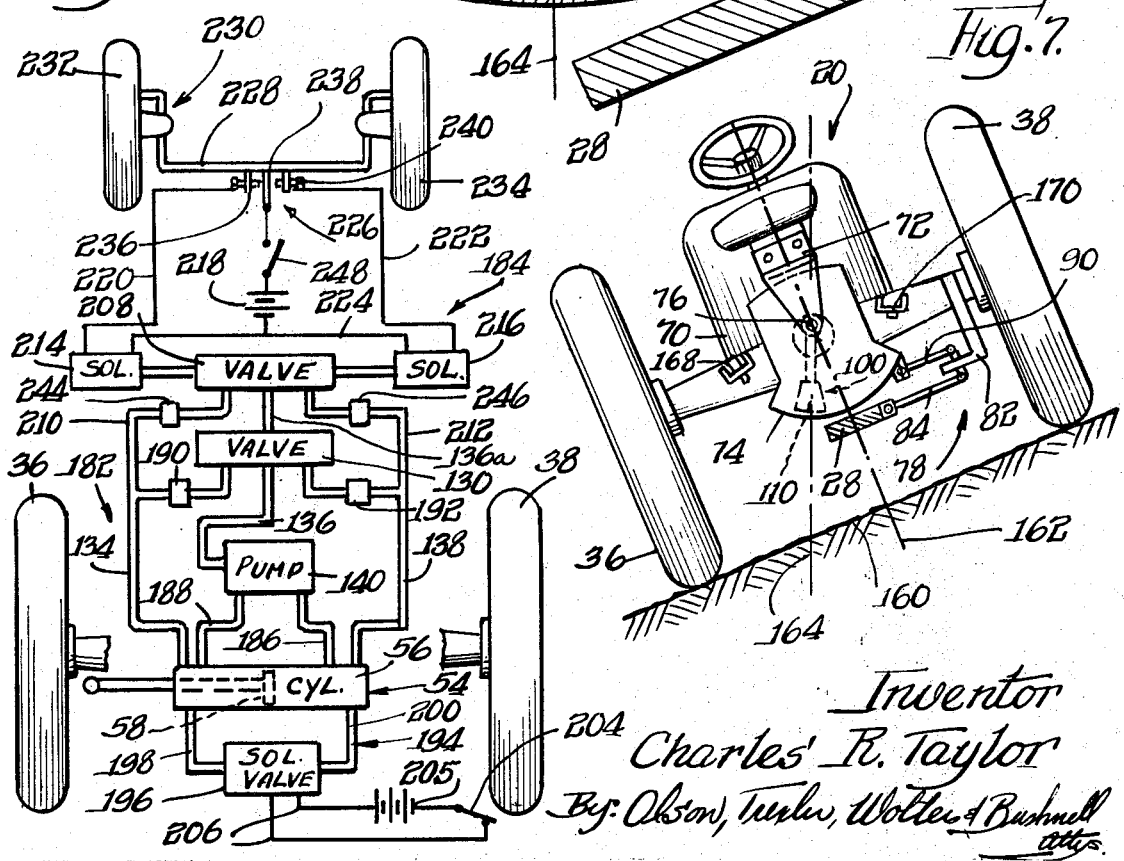

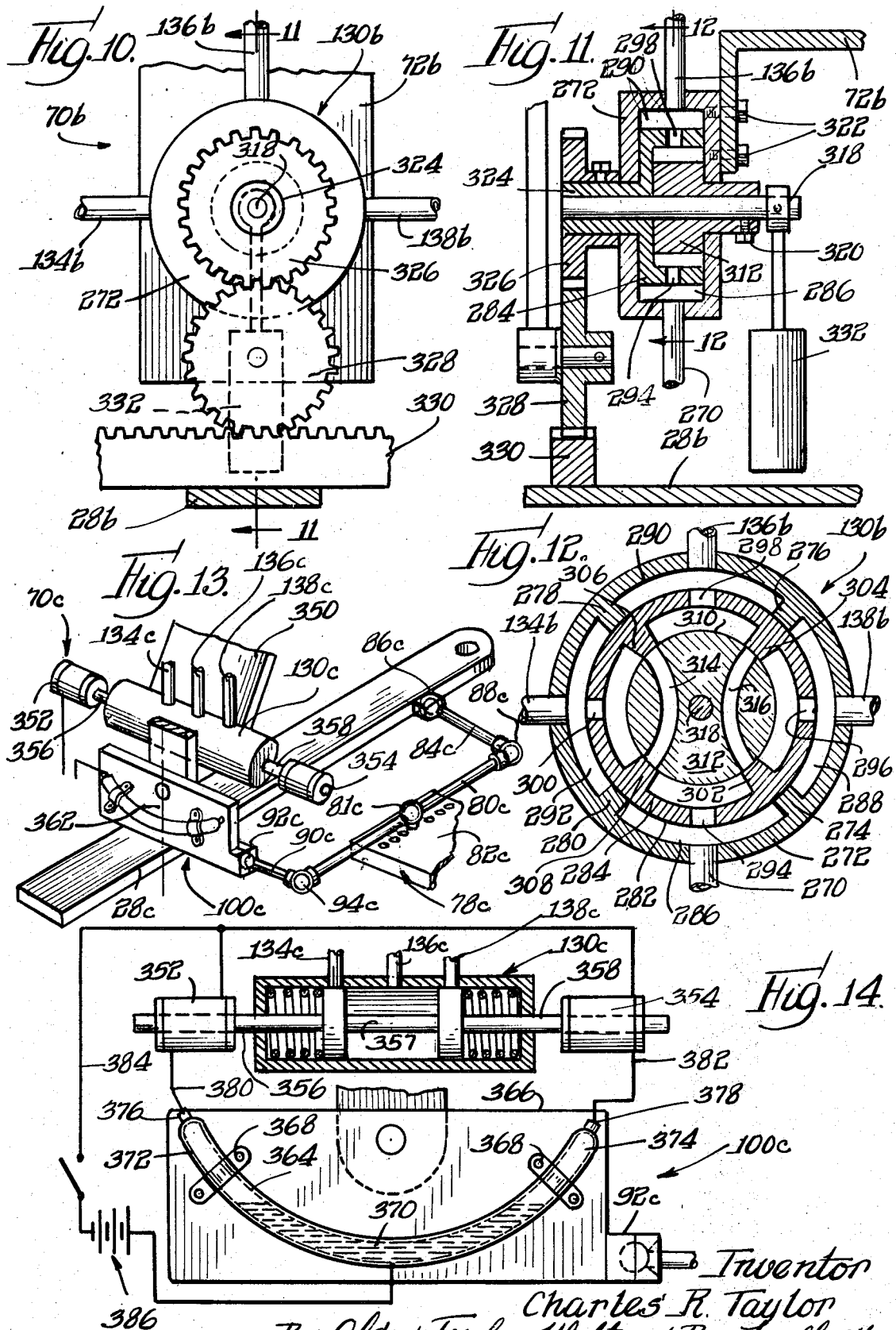

AUTOMATIC DRAW BAR ADJUSTMENT CONNECTION MEANS

The cultivating of hilly or sloping land is commonly done by contour plowing, to retard the erosion of the top soil from the sloping surface of the land. The contour plowing of hilly land is accomplished by forming furrows having a constant elevation on the side of the hill. To maintain a constant furrow elevation, a tractor must pull a plow transversely along the side of the hill. When a tractor is driven transversely along the side of a hill, gravity tends to make the tractor slide down the hill. To counteract this downward sliding tendency, it is a common practice among farmers either to crimp the front wheels slightly uphill or to attach the plow off-center of the tractor.

The crimping of the front wheels of a tractor, in order to maintain a given furrow elevation on a hillside wastes power. This waste of power results from the angled front wheels which tend to push the soil aside as the tractor travels forwardly. To compensate for the wasted power, the tractor is usually driven in a relatively low gear to supply the required power for both pulling the plow and pushing aside the soil. When driven in a relatively low gear, the speed and efficiency of the tractor, and the plowing operation, is greatly reduced.

To overcome the above-mentioned deficiencies inherent in crimping the front wheels of a tractor, it is a common prior art practice to offset the connection point of the plow relative to the center line of the tractor. The plow will then exert a torque or a turning force on the tractor. When the plow is offset on the uphill side of the tractor, the torque force will tend to turn the tractor uphill. This uphill torque force will offset the tendency of the tractor to slide downhill.

The greater the slope of the land the greater must be the torque applied to the tractor to overcome its tendency to slide downwardly. The amount of uphill torque can be varied by altering the distance which the plow is offset from the center line of the tractor. The larger the distance by which the plow is offset, the larger is the uphill torque. Thus, the plow is offset a greater distance when plowing on a steep slope than on a gentle slope. The slope of the land, at a given elevation, will vary greatly in the length of a field. Thus, when contour plowing a furrow on a hill, it is usually necessary to alter the distance by which the plow is offset relative to the center line of the tractor as a function of the slope of the hill. Efficient contour plowing requires that the plow offset be varied quickly and easily as the slope of the land varies.

Therefore, one of the objects of this invention is to provide a means for automatically varying the distance by which a plow is offset relative to a center line of a tractor as a function of the slope of a hill.

Another object of this invention is to provide a means for automatically altering the position of a connection for a plow relative to a tractor while the tractor is being driven forward.

Another object of this invention is to provide a means for sensing the slope of a hill, moving a draw bar to a predetermined position as a function of the slope of the hill, and automatically varying the position of the draw bar as the slope of the hillside varies.

These and other objects of the invention will become more apparent upon a reading of the following detailed description, taken in connection with the accompanying drawings, wherein:

FIG. 4 is a perspective view of the control mechanism and a linkage arrangement for attaching it to the connecting mechanism;

FIG. 5 is an enlarged sectional view, taken along the line 5–5 of FIG. 4, illustrating the control mechanism in the normal position;

FIG. 6 is an enlarged sectional view, along the line 6–6 of FIG. 5, illustrating the suspension of the control system;

FIG. 7 is a rear elevational view of the tractor of FIG. 1 on a hillside illustrating the relationship of the control mechanism to the tractor and draw bar before the draw bar is offset relative to the tractor;

FIG. 8 is an enlarged sectional view of the control mechanism, of the tractor of FIG. 7, illustrating the interrelationship of the control mechanism components when the tractor is on a hillside;

FIG. 9 is a schematic drawing of a main control system, utilized with the tractor of FIG. 1 and the control mechanism of FIG. 5, with an auxiliary control system for overriding the main control system;

FIG. 10 is an elevational view of a second embodiment of the control mechanism, wherein a radial valve and gears are utilized to control the positioning of a draw bar;

FIG. 11 is a cross-sectional elevational view of the control mechanism taken along the line 11–11 of FIG. 10, illustrating the relationship of the components of the control system;

FIG. 12 is a sectional view, taken along the line 12–12 of FIG. 11, illustrating the relationship of the components of FIG. 11 when the control mechanism is in its normal or neutral position;

FIG. 13 is a perspective view of still another embodiment of a control mechanism, wherein electrical sensing means is used to control the positioning of a draw bar; and FIG. 14 is a schematic plan of the control mechanism of FIG. 13 illustrating the control mechanism in its normal or neutral position.

Figure 1:
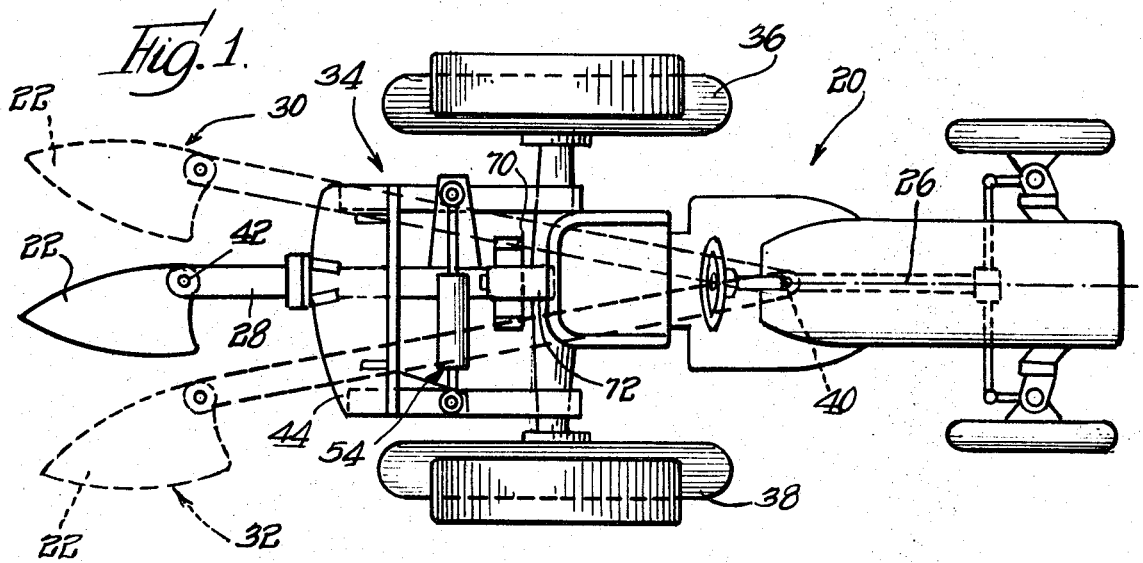
FIG. 1 is a plan view of a preferred embodiment of my invention as utilized for connecting a plow to a tractor and automatically varying the position of the plow relative to a tractor.
Figure 2:
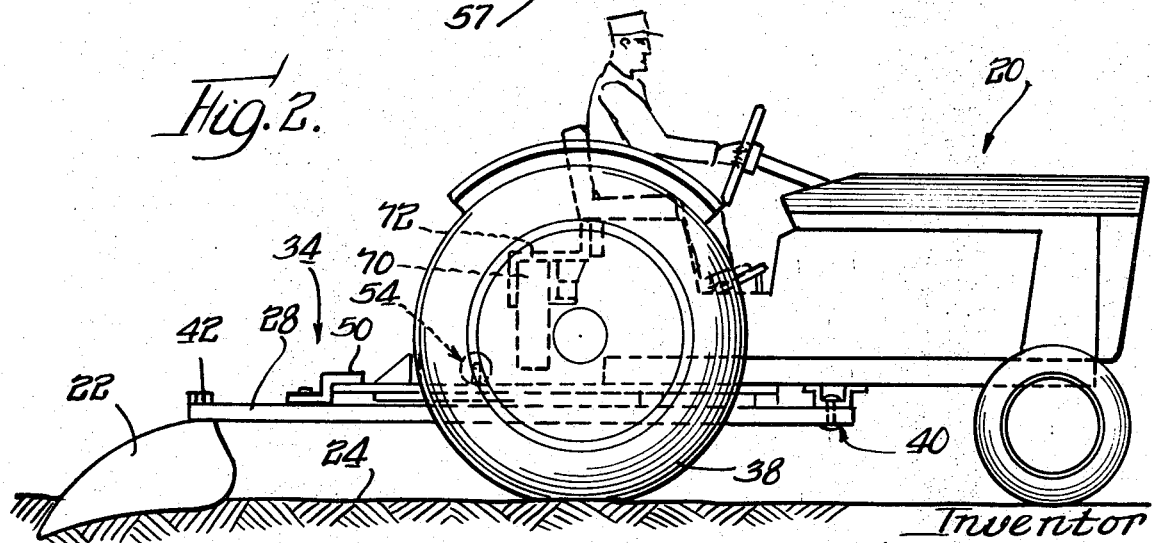
FIG. 2 is an elevational view, of the tractor of FIG. 1, illustrating the relationship of the connecting mechanism to a tractor and plow.

Referring now to the drawings in greater detail, there is shown in FIGS. 1 and 2 a tractor 20 which is pulling a plow 22 to form a furrow in the soil 24. The plow 22 is connected in alignment with a center line or axis 26 of the tractor by a draw bar 28. Since the plow 22 and draw bar 28 are in alignment with the center of the tractor, the plow exerts a rearward force, which has no turning moment, on the tractor as it is driven forward. As previously explained, when the side of a hill is being plowed, it is advantageous to exert an uphill turning moment of force on the tractor. If the draw bar 28 is swung to an offset position 30, indicated by dashed lines in FIG. 1, the turning moment causes the tractor to swing toward the driver's left, as viewed in FIG. 1. If the ground slopes uphill to the left, it is apparent that the leftward turning moment counteracts the tendency of the tractor to slide downhill to the right. Similarly, if the ground slopes uphill to the right, the plow and draw bar are swung toward the right to an offset position 32, indicated by dashed lines in FIG. 1, and a rightward turning moment is exerted on the tractor to counteract the tendency of the tractor to slide downhill to the left.

Figure 3:
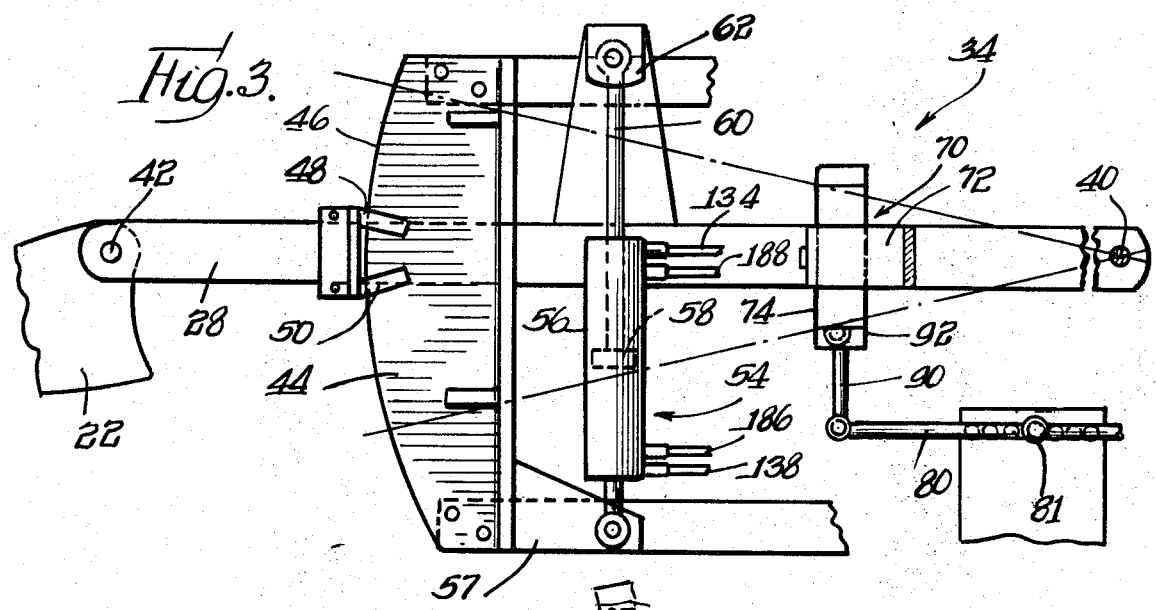
FIG. 3 is an enlarged detailed view of a preferred embodiment of the connecting mechanism and associated control mechanism.

The plow 22 is fastened to the tractor by an adjustable or hitch assembly 34 which is located generally intermediate rear wheels 36 and 38 of the tractor 20. The hitch assembly 34 as best seen in FIG. 3, includes the draw bar 28 which is pivotably fastened to the tractor by suitable connection means 40. At the opposite end of the draw bar 28 is a well-known connection structure 42 for attaching the plow 22 to the draw bar. The draw bar 28 is supported, for pivotable movement around the connection structure 40 by a support plate 44, which has an arcuate trailing edge 46. The support plate 44 is bolted, or connected by other suitable means, to the frame of the tractor 20. The draw bar 28 is movably supported on the plate 44 by horizontal rollers 48 and 50 which are positioned in rolling engagement with an upper surface of the support plate 44. The rollers 48 and 50 permit the draw bar 28 and plow 22 to be pivoted transversely relative to the tractor with very little frictional resistance.

The draw bar 28 is swung or pivoted relative to the tractor by means of a double acting hydraulic drive 54. The hydraulic drive 54 includes a cylinder 56 which is connected to a forwardly projecting bracket 57. Positioned for sliding movement within the cylinder 56 is a piston 58 which has an outwardly extending pushrod 60. The pushrod 60 is fastened to an arm 62 which projects transversely outwardly from the draw bar 28. The double acting drive unit 54 moves the draw bar 28 and plow 22, relative to the tractor 20, through the use of hydraulic fluid which moves the piston 58 and pushrod 60 relative to the cylinder 56. It should be noted that the hydraulic drive 54 is mounted above the heavy draw bar 28 (see FIG. 2) and is protected against damage by upwardly projecting objects over which the tractor is driven. The adjustable connection or hitch assembly 34 is described in greater detail in application Ser. No. 554,621 filed on May 5, 1966 by La Moyne Roberts.

The hydraulic drive 54 is operated in response to a control mechanism 70 which is, as shown in FIGS. 2 and 4, mounted on a bracket 72 on the tractor 20. As is perhaps best seen in FIG. 4, the control mechanism 70 includes an outer casing or housing 74 which is pivotably mounted on a transversely extending shaft 76. The housing 74 is advantageously connected to the draw bar 28 by means of a ball and socket joint linkage 78. The ball and socket linkage 78 includes a longitudinally extending bar member 80 which is pivotably mounted by a pin 81 on a frame member 82 of the tractor. The bar member 80 is connected to the draw bar 28 by a transversely extending bar 84 and ball joints 86 and 88. The bar member 80 is also connected to the housing 74 by a transversely extending bar 90 which is connected to the housing 74 by a ball and socket joint 92 and the bar member 80 by a ball and socket joint 94. It will be apparent, from an inspection of FIG. 4, that when the draw bar 28 is pivoted to the left the casing 74 is pivoted to the right about the shaft 76 by the linkage 78. Similarly, when the draw bar 28 is pivoted to the right, the linkage 78 pivots the casing 74 to the left. Therefore, the linkage 78 acts as a sensing means which is responsive to the position of the draw bar.

The pin 81 is slidably mounted on the bar member 80. The pin can be moved longitudinally along the bar member 80 to engage any one of a plurality of holes or apertures 96 which are formed in the frame 82 of the tractor. Thus, the pin 81 can be moved toward the ball joint 88 and positioned in engagement with a hole or aperture located forwardly of the position shown. It is apparent that when the pin 81 is moved toward the ball joint 88 the fulcrum point for the bar member 80 is shifted in such a manner as to increase the movement of the casing 74 relative to the frame of the tractor when the draw bar 28 is moved relative to the tractor. Conversely, when the pin 81 is moved rearwardly toward the ball joint 94, the casing 74 is moved through a relatively small arcuate distance relative to the tractor when the bar member 28 is moved relative to the tractor. By varying the location of the pin 81 the relative response of the control mechanism 70 to movements of the draw bar 28 can be varied. Although the pin 81 has been shown as being manually movable relative to the frame 82, it is contemplated that a lever or hydraulic arrangement will be connected to the pin to enable the pin 81 to be moved by actuating a suitable control mechanism mounted on the dashboard of the tractor. Such a control mechanism would enable the driver of the tractor to alter the position of the pin 81 and the response of the control unit 70 to the movements of the draw bar 28 while the tractor is in motion.

Referring to FIG. 5 taken in conjunction with FIG. 6 in which the control mechanism 70 is shown in greater detail, it will be seen that the casing 74 surrounds a sensing assembly 100. The sensing assembly 100 is rotatably mounted on the shaft 76 which is in turn journaled for rotation in the bearings 102 and 104. (see FIG. 6). The sensing assembly 100 includes a circular cam 106 connected to the shaft at a radially off-center mounting 108. A pendulum 110 is rigidly connected to the cam 106 by the vertically downwardly extending lever 112. The cam 106 and pendulum 110 are freely pivotable, about the shaft 76, around a transversely extending axis 114 of the control mechanism. A bath 116 of oil is provided in the lower part of the casing 74 to dampen this pivoting movement of the pendulum 110 relative to the casing. A hole 118 extends through the pendulum 110 to facilitate the pivoting movement of the pendulum in the oil bath 116.

A cam follower or yoke assembly 120 is securely connected to the housing 74 by a bracket 122. The bracket 122 slidably retains a longitudinally extending bar member 124 of the cam follower or yoke assembly 120. A pair of spaced apart substantially parallel following arms 126 and 128 are positioned in sliding engagement with the cam 106. When the pendulum 110 and cam 106 are pivoted about the shaft 76 the following arms 126 and 128 are displaced transversely relative to the casing 74. This displacement moves the bar member 124 and actuates a spool valve assembly 130 through the generally U-shaped upwardly extending connector bar 132.

The valve assembly 130 is connected by the conduits 134, 136 and 138 to the hydraulic drive 54 and a hydraulic pump 140 (see FIG. 9). The valve assembly 130 includes a cylindrical housing 142 in which a spool member 144 is slidably mounted. The spool member is retained in the normal central position, shown in FIG. 5, by springs 146 and 148 which engage opposite spool heads 150 and 152. When the spool member 144 is in the position shown in FIG. 5, the conduits 134 and 138, to the hydraulic drive 54, are blocked by the spool heads 150 and 152. When the pendulum assembly 100 is swung to the left, the following arms 126 and 128 pull the U-shaped connector bar 132 to the left. Movement of the connector bar 132 to the left opens the conduit 134 to enable hydraulic fluid to flow from the pump 140 through the central conduit 136 and the conduit 134 to the hydraulic drive unit 54. Hydraulic fluid then moves the piston 58 to the right, as shown in FIG. 3, and the draw bar 28 is also moved to the right to change the position of the plow 22 relative to the tractor 20. This rightward movement of the draw bar 28 causes the linkage 78 to pivot the casing 74 to the left and thereby tends to return the yoke assembly 122 to the normal position shown in FIG. 5 relative to the cam 106. It will be apparent to those skilled in the art that when the pendulum 110 swings to the right, the valve assembly 130 is actuated in a similar manner, to move the draw bar to the left while the linkage 78 will move the casing 74 to the right.

Referring now to FIGS. 7 and 8, the tractor 20 is shown on a surface 160 which slopes upwardly to the right. As indicated in FIG. 7, the sensing assembly 100 is pivoted to the left, about the shaft 76, under the influence of the pendulum 110. As is best seen in FIG. 8, the leftward movement of the pendulum 110 and cam 106 moves the cam follower or yoke assembly 120 to the left. The yoke assembly, through the connector bar 132, transmits this leftward movement to the valve assembly 130. The connector bar 132 moves the spool 144 to the left to permit hydraulic fluid to flow from the pump 140 through the conduits 136 and 134 to the hydraulic drive 54. As previously explained, the hydraulic fluid causes the drive 54 to move the draw bar 28 to the right. As the draw bar 28 is moved to the right, the linkage 78 moves the casing 74 to the left. Since the yoke assembly 120 and valve assembly 130 are securely connected to the casing 74, the leftward movement of the casing tends to move the yoke assembly 120 from the offset position of FIG. 8 to the vertical position of FIG. 5. When the yoke assembly has been moved, by rightward movement of the draw bar 28, to the normal position shown in FIG. 5, the spool member 144 blocks the conduits 134 and 138 to prevent the hydraulic drive 54 from displacing the draw bar 28 relative to the tractor 20.

The angular displacement of the draw bar 28 relative to the tractor 20 is a function of the angular displacement of the pendulum 110 relative to the central axis 162 of the control mechanism 70. The greater the vertical displacement of the pendulum 110 relative to the central axis 162 the greater is the angular displacement of the draw bar 28 relative to the tractor 20. This direct interdependance results from the fact that the distance which the linkage 78 moves to pivot the housing 74 into the upright position, shown in FIG. 5, varies as a function of the angular displacement of the pendulum 110. However, the angular displacement of the pendulum 110 relative to the central axis 162 of the control mechanism is a function of the slope of the surface 160. This is most clearly illustrated in FIG. 7 wherein it can be seen that the central axis 162 of the control mechanism 70 is perpendicular to the sloping surface 160. However a longitudinal axis 164 of the pendulum 110 is vertical, since the pendulum, under the influence of gravity, remains vertical at all times. Therefore, the draw bar 28 is offset a predetermined angular distance relative to the center line of the tractor, as a function of the slope of the surface 160.

The amount by which the draw bar 28 is offset relative to the tractor, in response to the control mechanism 70, varies directly with the slope of the hillside 16 over which the tractor is driven. Since the torque, or upward turning moment applied by the plow 22 to the tractor 20 is a direct function of the amount by which the draw bar 28 is offset relative to the tractor, the uphill turning moment or torque which is applied by the plow 20 is also a direct function of the slope of the hillside 160. Since the tendency of the tractor 20 to slide downhill is also a direct function of the slope of the hillside 160, the control mechanism 70 enables the plow 22 to be offset relative to the tractor by a predetermined amount to apply a sufficient uphill torque to just keep the tractor 20 on a horizontal path along the hillside 160. Therefore, as the tractor 20 is driven along a hillside having a varying slope, the control mechanism 70 automatically offsets the plow 22, relative to the tractor 20, by a varying amount to apply an uphill torque to the tractor which just balances or offsets the downhill sliding tendency of the tractor.

The torque applied by the plow 22 to the tractor 20 will also vary as a function of the draft or loading of the plow on the draw bar 28. Thus, for a given degree of offset of the plow 22 relative to the tractor 20, the uphill torque applied to the tractor by the plow will vary with the resistance of the plow to movement through the soil of the hillside. Since the tendency of the tractor to slide downhill will remain a substantially constant function of the slope of the hillside, it is necessary to vary the degree of offset of the plow relative to the tractor as a function of the loading or draft applied to the draw bar 28 by the plow 22. Since the operation of the control unit is a function of the slope of the hillside and the sensed movement of the draw bar 28 relative to the tractor 20, the offset of the plow for a given hillside slope can be varied by altering the position of the fulcrum pin 81 for the bar 80 relative to the frame 82 of the tractor. When a relatively light draft or load is applied by the plow 22 to the tractor 20, the pin 81 should be moved toward the ball joint 94 so that the plow 22 must be offset a relatively large distance before the control assembly is moved to a vertical position by the linkage 78. Thus, when a relatively small load is applied to the draw bar 28, the fulcrum pin 81 is moved toward the control assembly so that a relatively large degree of offset of the draw bar 28 is obtained for a relatively small degree of movement of the control mechanism 70. Conversely, when a relatively large load is applied to the draw bar 28 the fulcrum pin 81 is moved toward the ball joint 88 so that a relatively small degree of offset is required to move the control mechanism through a relatively large distance. It will be apparent to those skilled in the art that the movable fulcrum pin 81 enables the torque applied to the tractor 20 by the plow 22 to be varied as a function of the draft or load applied to the draw bar 28 by the plow.

Although the tractor 20 is relatively stable on its widely spaced rear wheels 36, 38, it is possible to overturn the tractor by driving it on a hill having an extremely steep slope. Since the tractor 20 is normally driven on sloping surfaces, the driver of the tractor might not be aware of the fact that the tractor is being driven on a hillside having a sloping surface which could cause the tractor to overturn. Therefore, a pair of limit switches 168 and 170 are mounted on the frame members 172 and 174 adjacent to the casing 74. The limit switches, through the leads 176 and 178 are connected to a warning light on a control panel of the tractor. When the slope of the hillside is so steep that it is likely to overturn the tractor 20 the casing 74 engages one of the limit switches 168 or 170 to complete an electrical circuit to the warning light. Since the switches 168 and 170 are connected together in parallel and are in turn connected in series with the warning light in a relatively simple circuit, it is believed that the electrical circuit is obvious to those skilled in the art and has not, therefore, been shown.

A schematic illustration of the control system for the adjustable connection assembly 34 is illustrated in FIG. 9. The control system shown in FIG. 9 includes a main or primary control system 182 and an auxiliary control system 184 which is connected to the main control system 182. The main control system 182 includes the valve 130 which is connected to the pump 140 by the fluid conduit 136. In a similar manner, the valve 130 is connected to the hydraulic drive cylinder 56 by the fluid conduits 134 and 138. High pressure fluid from the pump 140 flows through the conduit 136 to the valve 130. The valve 130, in the manner previously explained, selectively routes the fluid through either the conduits 134 or 138. If the valve 130 is actuated by the control mechanism 70 to route the fluid through the conduit 134, the piston 58 is moved toward the right by high pressure fluid which enters the left end of the cylinder 56. Simultaneously with the rightward movement of the piston 58 hydraulic fluid is returned to the pump 140 through a fluid conduit 186. When the control mechanism 70 actuates the valve 130 to direct fluid from the conduit 136 through the conduit 138 to the right end of the cylinder 56, the piston 58 is moved to the left and hydraulic fluid is returned to the pump 140 through a conduit 188.

A pair of shut-off valves 190 and 192 are mounted in the conduits 134 and 138 leading from the valve 130. When the shut-off valves 190 and 192 are closed the valve 130 will be effectively locked out of the hydraulic system. Thus, with the valves 190 and 192 closed, the control mechanism 70 is unable to effect a change in the position of the draw bar 28 through the drive mechanism 54.

A disabling circuit 194 is connected to opposite ends of the cylinder 56. The disabling circuit 194 includes an electrically actuated normally closed solenoid valve 196 which is connected by a conduit 198 to the left end of the cylinder 56 and by a conduit 200 to the right end of the cylinder 56. The normally closed solenoid valve 196 is opened by closing switch 204. Closing switch 204 connects a battery 205, through switch 204 and leads 206, to hold the solenoid valve open. When the solenoid valve 196 is opened, fluid can flow through the conduits 198 and 200, from the left to the right end and from the right to the left end of the cylinder 56. Therefore, when the solenoid valve 196 is opened, the hydrualic drive 54 acts as a shock absorber or damper against the movement of the draw bar 28. This dampening effect is obtained in conjunction with the piston 58 which forces hydraulic fluid from one end of the cylinder through the lines 198 and 200 into the opposite end of the cylinder. Therefore, the drive mechanism 54, when the solenoid valve 196 is opened, acts as a shock absorber for the draw bar 28. This shock absorbing feature of the adjustable hitch assembly permits the hitch to be advantageously utilized for many purposes other than pulling a plow.

An auxiliary control system 184 is connected to the main control system 182. The auxiliary control system 184 includes a spool valve 208 which is similar in structure to the valve 130. The spool valve 208 connects the line 136A, which is a continuation of the line 136 from the pump 140, to either a left-hand conduit 210 or a right-hand conduit 212. When the left-hand conduit 210 is connected, through the valve 208 and conduit 136A to the pump 140, high pressure fluid flows from the pump through the valve 208 and the conduit 210 to move the piston 58 to the right. In a similar manner, when the conduit 212 is connected to the pump 140, through the valve 208 and conduit 136A, high pressure fluid forces the piston 58 to the left. It will be apparent to those skilled in the art that the structure and operation of the valve 208 are substantially the same as that of the valve 130 and, therefore, need not be described in greater detail at this time.

The valve 208 is actuated by means of solenoids 214 and 216 which are connected to opposite sides of the spool valve. The solenoids 214 and 216 are energized, by electrical energy from a battery 218 through the leads 220, 222 and 224. The circuit through the leads 220, 222 and 224 to the solenoids is completed through a switch 226 which is connected to a tie-rod 228 of the steering mechanism 230 for front wheels 232 and 234 of the tractor. When the front wheels are turned to the left, a left-hand contact 236 of the switch 226 mates with a central contact lever 238 to complete a circuit, through the leads 220 and 224, for energizing the solenoid 214. Energizing the solenoid 214 connects the conduit 136A to the conduit 212 to move the piston 58 to the left, that is, the same direction in which the wheels 232 and 234 were turned. In a similar manner, when the wheels 232 and 234 are turned to the right, a contact 240 on the tie-bar 228 mates with the central contact lever 238 to energize the solenoid 216. Energization of the solenoid 216 operates the valve 208 to connect the fluid conduit 210 to the conduit 136A. When the conduit 210 is connected to the conduit 136A, high pressure fluid flows from the pump 140 through the conduit 210 to move the piston 58 to the right. Therefore, the auxiliary control mechanism 184 enables the piston 58, and the draw bar 28, to be moved in the same direction in which the wheels 232 and 234 of the tractor are turned.

The movements of the draw bar 28 are controlled by the auxiliary control system 184 when the valves 190 and 192 are closed. Therefore, if desired, a driver of the tractor 20 can effectively disable the automatic main control system 182, which positions the draw bar as a function of the slope of the terrain over which the tractor is driven, and control the positioning of the draw bar by means of the auxiliary circuit 184 which is responsive to the steering mechanism 230 of the tractor. A pair of auxiliary shut-off valves 244 and 246 are mounted in the conduits 210 and 212 to enable the auxiliary control system 184 to be effectively shut out of the circuit. The solenoids 214 and 216 can also be effectively disabled by opening a switch 248 leading from the battery 218 to the switch 226.

In order to enhance the understanding of the invention, several modified forms are shown in FIGS. 10 through 14. In these modified forms of the invention like numerals have been used to designate like parts, with the suffix letter *b* being used to distinguish the elements associated with FIGS. 10 through 12, and the suffix letter *c* being used to distinguish the elements of FIGS. 13 and 14. Referring now to FIG. 10, a control assembly 70*b* is illustrated. The control assembly 70*b* includes a radial valve 130*b* to which fluid conduits 134*b*, 136*b*, and 138*b* are connected. As previously explained, in connection with the embodiment of FIGS. 1 to 9, the conduits 134*b* and 138*b* lead to opposite sides of a drive cylinder, similar to the drive cylinder 56. The conduit 136*b* is connected to a pump similar to the pump 140. A fourth conduit 270 (see FIG. 12) leads from the valve 130*b* to the fluid return side of the pump.

The conduits 134*b*, 136*b*, 138*b* and 270 are connected to a cylindrical outer manifold housing or ring 272 which has a plurality of radially inwardly extending walls 274, 276, 278 and 280 which are in sliding sealing engagement with a radially outer surface 282 of a control ring or housing 284. The walls 274, 276, 278 and 280 separate a plurality of manifold chambers 286, 288, 290 and 292 which are defined by the inwardly extending walls, the radially outer surface 282 of the control ring, and the manifold housing or ring 272. A plurality of passages 294, 296, 298 and 300 are formed in the control ring 284 midway between the radially inwardly extending walls 274 to 280. The control ring 284 includes a plurality of radially inwardly extending blocking walls 302, 304 306 and 308. The blocking walls 302 to 308 are in sliding sealing engagement with a radially outer surface 310 of a fluid distributing cylinder 312. A pair of arcuate fluid conducting passages 314 and 316 are formed in the fluid distributing cylinder 312.

The fluid distributing cylinder 312 is connected to a transversely extending shaft 318, by a set screw 320 (see FIG. 11).

Referring now to FIGS. 10 and 11, it will be seen, in FIG. 11, that the outer manifold ring or housing 272 is fixedly secured, by suitable connection means 322, to a bracket 72*b*. The control ring or housing 284 includes an axially extending cylindrical mounting section 324 to which a gear 326 is secured. The control ring or housing 284 is rotatable relative to the shaft 318 and the manifold housing 272. A pinion gear 328 is mounted in meshing engagement with the gear 326 and a rack 330 on a draw bar 28*b*. Therefore, when the draw bar 28*b* is moved relative to a tractor 20*b*, the rack 330 rotates the pinion 328 and the gear 326. The rotation of the gear 326 rotates the control ring 284 relative to the fluid distributing cylinder 312 and the manifold housing 272.

A pendulum 332 is secured to an end of the shaft 318. When a tractor 20*b* is driven on sloping terrain, the pendulum 332 pivots relative to the fixed manifold housing 272 and the control ring 284. When the pendulum 332 pivots the shaft 318 and the fluid distributing cylinder 312 to the right, or in a counterclockwise direction, as viewed in FIGS. 10 and 12, relative to the control ring 284, high pressure fluid from the pump flows through the conduit 136*b*, the passage 298, and into the arcuate passage 316. The high pressure fluid then flows from the passage 316 through the passage 296 and through the fluid conduit 138*b* to the right end of the hydraulic drive cylinder. Contemporaneously with the above fluid flow, return fluid will be conducted from the hydraulic conduit 134*b*, through the passage 300 in the control ring 284 into the arcuate passage 314 in the fluid distributing cylinder 312. The return fluid flows through the passage 314, the passage 294 and into the return conduit 270 to the pump 140*b*. Therefore, in much the same manner as previously explained with the spool valve 130, the radial valve arrangement 130*b*, when the pendulum 332 is pivoted to the right, actuates the hydraulic drive to swing the draw bar to the left.

The leftward movement of the draw bar 28*b* rotates the pinion gear 328 in a clockwise direction, through engagement of the gear 328 with the rack 330. The clockwise rotation of the gear 328 imparts a counterclockwise rotation to the control ring 284. The counterclockwise rotation of the control ring 284 results in the blocking walls 302 through 308 being brought into alignment with the outer ends of the arcuate passages 314 and 316 in the fluid distributing cylinder 312. The blocking walls 302 through 308 seal the passages 314 and 316 to prevent fluid, from the conduit 136*b*, from being distributed to the conduit 138*b* to energize the drive 54*b*. Thus, in much the same manner as the linkage system 78 in the embodiment of FIGS. 1 to 9 pivots the casing 74 to a neutral position relative to the cam and pendulum 106 and 110, the pinion and rack gears 328 and 330 rotate the control ring 284 to a neutral position to block the passages 314 and 316 when the draw bar 28*b* has been moved a predetermined angular distance relative to the tractor 20*b*. Since the pendulum 332 remains in a substantially vertical position, the angular offset of the control ring relative to the distributing cylinder 312 is a function of the slope of the terrain over which the tractor is driven. It will be apparent, of course, that, when the tractor is driven over a terrain which slopes uphill to the right, the distributing cylinder 312 is offset in a clockwise direction or to the left, to drive the draw bar 28*b* to the right, in much the same manner as previously explained.

At any given time, the amount of angular offset of the control ring 284 is a direct function of the ratio of the gear 326 to the gear 328. The response of the control assembly 70*b* to the slope of a hillside can be varied by changing the ratio of the gears 326 and 328. Changing the ratio of the gears 326 and 328 has much the same effect as changing the location of the pivot or fulcrum pin 81 in the linkage system 78 of the embodiment of FIGS. 1 to 9. Thus, when a relatively large load or draft is exerted on the draw bar 28*b*, the gear 328 will be relatively small, so that a small degree of offset, of the draw bar 28*b* results in a comparatively large degree of angular offset of the control ring 284. This relatively large offset of the control ring 284 is desirable when the draft or load on the draw bar 28b is large because the large load or draft will exert the required uphill torque on the tractor with a small lever arm resulting from the relatively small degree of offset of the draw bar 28b. Similarly, when the draft or load on the draw bar 28b is relatively small a larger lever arm is required to exert the necessary uphill torque on the tractor. Therefore, when the draft or load on the draw bar 28b is relatively small the gear 328 should be relatively small while the gear 326 is relatively large. As will be apparent to those skilled in the art, the gears 326 and 328 can be manually replaced or a suitable transmission means can be inserted in driving relationship with the control ring 284 and the draw bar 286. If such a transmission were to be used, it is contemplated that the controls for the transmission would be mounted on the dashboard of the tractor to facilitate varying the gear ratio while the tractor is in motion.

An electrical embodiment of the hydraulic control mechanism is illustrated in FIGS. 13 and 14. The control system 70c, of FIGS. 13 and 14, includes a spool type valve 130c, similar to the spool valve 130 of the embodiment of FIGS. 1 to 9, which is securely mounted on a fixed frame member 350 of a tractor 20c. A fluid conduit 134c is connected to a left-hand end of a hydraulic drive cylinder (not shown), while the fluid conduit 138c is connected to a right-hand end of the fluid drive cylinder. The fluid conduit 136c is connected to a pump, similar to the pump 140. The spool type valve 130c is actuated by a pair of electric solenoids 352 and 354 which are connected to opposite ends of the spool valve 130c. When the solenoid 352 is energized, a bar member 356 draws a spool member 357 in the valve 130c to the left, to enable high pressure fluid to be conducted from the conduit 136c to the conduit 134c. Similarly, when the solenoid 354 is energized, a bar member 358 is drawn to the right to enable fluid to be conducted from the conduit 136c through the conduit 138c. As previously explained, in connection with the embodiment of FIGS. 1 to 9, high pressure fluid flows through the conduit 134c to move the draw bar to the right. Similarly, when high pressure fluid is conducted through the conduit 138c the draw bar 28c is moved to the left.

A linkage 78c is connected to the draw bar 28c (see FIG. 13). The linkage 78c includes a longitudinally extending bar member 80c which is pivotably connected at 81c to a frame member 82c of the tractor. The bar member 80c is connected by a transversely extending link 84c and the ball joints 86c and 88c to the draw bar 28c. The bar 80c is also connected to a pivotably mounted sensing assembly 100c by a transversely extending link 90c and the ball joints 92c and 94c. Therefore when the draw bar 28c is moved to the left, the linkage 78c pivots the sensing assembly 100c about a vertical axis 362 to the right. Similarly, when the draw bar 28c is moved to the right, the linkage assembly 78c pivots the sensing assembly 100c to the left about the pivot axis 362.

Referring now to FIG. 14, in which the sensing assembly 100c is shown in greater detail, it can be seen that the sensing assembly includes an arcuate tube member 364 which is secured to a base member 366 by the brackets 368. The arcuate tube member 364 is filled with an electrically conductive sensing fluid 370. When the tractor 20c is driven over a sloping terrain, the electrically conductive sensing fluid 370 flows to one of the upper end portions 372 or 374 of the tube member 364 and makes electrical contact with a control element 376 or 378. When the electrically conductive fluid 370 makes contact with a control element 376 or 378, a circuit is completed through the electrical leads 380 or 382 and 384 to a solenoid 352 or 354. When the circuit is completed, electrical current can flow from a battery 386 through the fluid 370 to energize a solenoid 352 or 354 and actuate the valve assembly 130c and move the draw bar 28c. Movement of the draw bar 28c causes the linkage assembly 78c, as previously explained, to pivot the base member 366 relative to the vertical axis 362 to restore the sensing assembly 100c to the normal position shown in FIG. 14.

For purposes of affording a more complete understanding of the invention, it is advantageous now to provide a functional description of the mode in which the component parts of the various embodiments of the invention operate. The plow 22 is connected to the tractor 20 by an adjustable hitch assembly 34, so that the plow 22 can be offset from a longitudinally extending center line 26 of the tractor. The position of the plow 22 is adjusted by a control mechanism 70 which includes a sensing assembly 100. If the tractor is driven over a sloping terrain, the sensing assembly 100 will be offset by an angular amount which is a direct function of the degree of slope of the terrain. When the sensing assembly 100 is offset, a valve 130 will be actuated by means of a cam 106 and yoke or follower assembly 120. If the ground slopes uphill to the right, as shown in FIG. 7, the sensing assembly will be offset to the left relative to a transversely extending axis 162 of the tractor. When the sensing assembly 100 is offset to the left, as seen in FIG. 8, the spool valve 130 will be operated to connect high pressure fluid through the conduit 136 and valve 130 to the conduit 134. The high pressure fluid will flow through the conduit 134 to the left end of the hydraulic drive cylinder 54 to move the piston 56 and draw bar 58 to the right. This movement of the draw bar to the right will result in the pivoting of the linkage assembly 78 to swing the casing 74 to the left. As the draw bar 28 is moved to the right, the casing 74 will gradually swing to the normal position, shown in FIG. 5, relative to the sensing assembly 100 to close the valve 130 and deenergize the hydraulic drive 54.

When the tractor is driven along the hillside, the slope of the terrain will undoubtedly change. As the slope changes, the sensing assembly 100 will be pivoted about the shaft 76 to actuate the spool valve in much the same manner as previously set forth. Thus, the sensing assembly will maintain the plow 22 at an angularly offset position relative to the center line 26 of the tractor. The amount of offset at which the plow is maintained will, of course, depend upon the slope of the terrain. Therefore, the control assembly 70 will automatically vary the position of the plow 22, relative to the tractor 20, as the slope of the terrain over which the tractor is driven varies.

The degree to which the draw bar 28 is offset relative to the tractor 20 can also be varied as a function of the draft or load exerted on the draw bar by the plow 22. When the plow 22 exerts a relatively large load on the draw bar 28 the pivot or flucrum pin 81 will be moved rearwardly, toward the ball joint 88, so that a relatively small displacement of the draw bar is required to move the control assembly or mechanism 70 to a vertical position. Of course, the relatively small displacement of the drawbar 28 will result in a relatively small lever arm for the relatively large load to act on. Conversely, when a relatively small load is exerted on the draw bar 28, the fulcrum or pivot pin 81 will be moved rearwardly, toward the ball joint 94, so that a relatively large displacement of the draw bar is required to move the control assembly 70 to a vertical position. The relatively large displacement of the draw bar 28 will result in a relatively large lever arm for the small load to act on to provide the necessary uphill torque.

A radial valve assembly has been illustrated in FIGS. 10 through 12 for actuating the draw bar. The radial valve assembly 130b is actuated in response to the pivoting movement of a pendulum 332 connected to the central fluid distributing cylinder 312. When the fluid distributing cylinder 312 is offset, from the normal position shown in FIG. 12, fluid will be conducted through the arcuate passages 314 and 316 to enable the hydraulic drive to move the plow 22b relative to the tractor 20b. As the draw bar is offset relative to the tractor, the rack and pinion gears 326, 328 and 330 will pivot a control ring 284 relative to the central fluid distributing cylinder 312 to close the valve assembly 130b when the draw bar 28b is pivoted a predetermined angular distance relative to the tractor 20b. The degree of offset of the control ring 284 can be changed as a function of the load on the draw bar 286 by varying the ratio of the gears 326 and 328. As previously explained, varying the ratio of the gears 326 and 328 varies the torque lever arm in much the same manner as varying the position of the pivot or fulcrum pin 81.

In FIGS. 13 and 14 an electrical sensing assembly 100c is illustrated for actuating the spool valve 130c. The electrical sensing assembly 100c includes an electrically conductive sensing fluid 270, such as mercury, which is encapsulated in the tube member 364. When the tractor 20c is driven over a sloping terrain, the electrically conductive sensing fluid 270 will complete an electrical circuit to a solenoid to operate the valve 130c and pivot the draw bar 28c relative to the tractor. A linkage assembly 78c is connected to a base member 366 of the sensing assembly 100c. As the draw bar 28c is pivoted relative to the tractor 20, the linkage 78c will pivot the sensing assembly 100c to the normal position shown in FIG. 14 and deenergize the solenoid to close the valve 130c. Of course, the position of the pivot or fulcrum pin 81c can be varied in the same manner as is the position of the pivot pin 81 to vary the torque arm as a function of the loading of the draw bar 28c.

As has been illustrated in FIG. 9, an auxiliary control circuit 184 is advantageously connected to the main control circuit 182 for the control mechanism 70. The auxiliary control circuit 184 includes a valve 208 which is selectively actuated by the steering mechanism 230 for the tractor 20. The auxiliary control system 184 enables a driver of the tractor to override the automatic slope sensing control mechanism 70. Therefore, the driver, by closing the valves 190 and 192, can, if desired, manually actuate the hydraulic drive 54 through the auxiliary control assembly 184.

Although several illustrative embodiments of the invention have been disclosed, it is contemplated that many modifications will occur to those skilled in the art upon reading this disclosure. Therefore, although the preferred embodiment of the invention utilizes a pendulum and cam arrangement to actuate a hydraulic system in response to the slope of terrain over which a tractor is driven, it is contemplated that an electrical and other equivalents of the hydraulic system could be utilized to control the movements of a draw bar. In addition, different types of known sensing assemblies, which can be made responsive to the slope of the terrain over which the tractor is driven, will undoubtedly be used by those skilled in the art. It is also apparent that the automatic control mechanism will find many applications in areas other than with a tractor for contour plowing a field.

I claim:

1. In a tractor having an earth working implement connected thereto by a draw bar apparatus providing for automatic adjustment in the position of said draw bar relative to said tractor as a function of the slope of the terrain over which the tractor is being operated, such that a moment created by said earth working implement when offset, may be utilized to counteract the gravitational forces acting on said tractor, said apparatus comprising: drive means operably connected to said draw bar for effecting horizontal pivotal movement of said draw bar and earth working implement relative to said tractor; a main control means mounted on said tractor operably connected with said drive means, and including, a first sensing means responsive to changes in attitude of the tractor relative to the vertical axis and operably connected to said drive means, and a second sensing means operably connected between said first sensing means and said draw bar and responsive to the position of said draw bar, wherein upon a detection of a change in attitude of the tractor, said first sensing means will activate the drive means to effect initial movement of the draw bar to a desired position, said movement of the draw bar being operable through said second sensing means to deenergize the drive means once said desired position of the draw bar is realized.

2. Apparatus as defined in claim 1 wherein said drive means include a control circuit responsive to said first and second sensing means to enable said drive means to move said draw bar relative to said tractor when the attitude of the tractor relative to the vertical axis is changed.

3. Apparatus as defined in claim 1 wherein said drive means include a hydraulic control circuit, a pump, a double-acting operating cylinder connected to said draw bar to effect pivotal movement thereof, and a control valve disposed in said circuit for directing hydraulic actuating fluid to one side or the other of said double-acting cylinder, said first sensing means being connected with said control valve to effect operation thereof.

4. Apparatus as defined in claim 3 wherein said first sensing means include a pendulum member which remains in a substantially constant relationship with respect to the vertical axes, but will vary in its relationship relative to the axes of said tractor due to the slope of the terrain, and means interconnecting said pendulum with the flow control valve whereby said valve is operated by the movement of said pendulum relative to the axes of said tractor.

5. Apparatus as defined in claim 4 wherein said first sensing means further include a housing rotatably mounted to said tractor and having said pendulum mounted therein, said second sensing means including a linkage interconnecting said housing and said draw bar, whereby said housing will be moved relative to said pendulum as a function of the pivotal movement of the draw bar to close said valve control means once the desired position of said draw bar is attained.

6. Apparatus as defined in claim 3 wherein said second sensing means include means operably interconnecting said draw bar and said flow control valve such that movement of the draw bar is effective to close said flow control valve once the desired position of the draw bar is attained.

7. Apparatus as defined in claim 1 further including signal means mounted on the tractor to indicate when the attitude of the tractor relative to the vertical axis is outside a predetermined range.

8. Apparatus as defined in claim 1 further including; auxiliary control means mounted on said tractor and connected to said drive means, said auxiliary control means being selectively operable to enable a driver of a tractor to vary the position of the draw bar independently of the variations in the slope of the terrain over which the tractor is being driven.

9. Apparatus as defined in claim 8 wherein said auxiliary control means include means to over-ride the main control means, and means operably interconnecting said auxiliary control means to the steering mechanism of the tractor whereby said drive means may be actuated by said steering mechanism.

10. Apparatus as defined in claim 1 wherein said first sensing means include; a pendulum member rotatably mounted to said tractor which remains in a substantially constant relationship with respect to the vertical axis while varying with respect to the upright axes of said tractor, cam means associated with said pendulum means and movable thereby, and follower means engaged and operated by said cam means, said follower means being effective to energize said drive means and thereby alter the relationship of said draw bar relative to the tractor as a function of the variation of the relationship of said pendulum with respect to the upright axes of said tractor.

11. Apparatus as defined in claim 10 wherein said first sensing means further include a housing member having said pendulum, said cam and said follower means disposed therein, said housing being rotatably mounted with respect to said tractor independently of said pendulum member, and said second sensing means being connected to said housing to vary the positioning thereof relative to the upright axes of the tractor such that upon movement of the draw bar said housing may be pivoted to a position wherein the drive means is deenergized.

12. An assembly as set forth in claim 3 wherein said second sensing means includes gear means, said gear means being rotated by movement of said bar member to close said valve means.

13. An assembly as set forth in claim 2 wherein said first sensing means includes an electrical switch means which is actuated from a first position to a second position in response to changes in the attitude of the tractor relative to the vertical axis to enable hydraulic fluid to flow in said control circuit means, and said second sensing means actuates said electrical switch means from said second position to said first position when said bar member is in a predetermined relationship with the tractor, said predetermined relationship varying as a function of the attitude of the tractor relative to the vertical axis.

14. An assembly as set forth in claim 1 wherein said main control means includes pendulum means which remains in a substantially constant relationship with a vertical axis, valve means associated with said pendulum means for operating said drive means, valve control means associated with said pendulum means and said valve means to operate said valve means as a function of variations between the relationship of said pendulum means and said valve control means, and gear means associated with said valve control means and said bar member to vary the relationship between said pendulum means and said valve control means as a function of variations in the relationship of said bar member to the tractor.

15. An assembly as set forth in claim 14 wherein said gear means can be adjusted to alter the relationship of said valve control means to said bar member as a function of the load exerted on said bar member.